United States Patent [19]

Leftault, Jr.

[11] 4,234,028
[45] Nov. 18, 1980

[54] TRACTION ASSEMBLY FOR VEHICLE WHEELS

[76] Inventor: Charles J. Leftault, Jr., 5100 Scenic Rd., Murrysville, Pa. 15668

[21] Appl. No.: 894,382

[22] Filed: Apr. 7, 1978

[51] Int. Cl.³ .............................................. B60C 27/02
[52] U.S. Cl. ................................................... 152/233
[58] Field of Search ................... 152/213 R, 233, 172, 152/175, 176, 179, 182, 183, 187, 188, 191, 220–230, 373

[56] References Cited

U.S. PATENT DOCUMENTS

| | | | |
|---|---|---|---|
| 2,686,550 | 8/1954 | Hoffman | 152/233 |
| 3,091,274 | 5/1963 | Winkelspecht | 152/233 X |
| 3,513,897 | 5/1970 | Morris | 152/233 |
| 3,854,514 | 12/1974 | Edwards | 152/233 |
| 3,945,162 | 3/1976 | Martinez et al. | 152/233 X |

Primary Examiner—Robert B. Reeves
Assistant Examiner—Gene A. Church
Attorney, Agent, or Firm—Arnold B. Silverman; Thomas H. Murray

[57] ABSTRACT

A wheel having a spider portion and a rim portion, a tire mounted on the wheel. The tire having a pair of sidewalls and an interposed, ground engaging portion. At least one anchor member secured to the spider portion and disposed on the inner side of the wheel. Traction members secured to the anchor member adjacent to one tire sidewall and extending beyond the tire ground engaging portion to the other sidewall. The traction member being secured adjacent to the other sidewall also.

26 Claims, 25 Drawing Figures

TRACTION ASSEMBLY FOR VEHICLE WHEELS

BACKGROUND OF THE INVENTION

1. Field of the Invention

This invention relates to anti-skid vehicle wheel assemblies, and, more specifically, it relates to means for permitting ready installation and removal of traction means as needed or desired.

2. Description of the Prior Art

In connection with highway vehicles, such as cars and trucks, for example, the hazards of driving on icy or snow-covered roads are well known. Roads which are wet, icy or snow-covered reduce the traction which exists between the vehicle wheel and the road surface, thereby making it more difficult to control the vehicle and increasing the risk of potentially serious accidents. Over the years numerous approaches to improving traction under adverse driving conditions have been suggested. The use of both studded and unstudded snow tires during the winter season has been adopted. Also, the use of chains which consist of a continuous band which covers the entire tire circumferentially and is provided with a plurality of transverse, ground engaging chain members, has also been known.

Under numerous types of winter driving conditions, snow tires, without studs, may prove inadequate in respect of desired traction. While studded tires serve to improve traction, such tires tend to be damaging to road surfaces during normal driving conditions, and the use of such tires has been restricted or prohibited by law in many states.

While chains may provide effective traction under certain conditions, they are awkward to use as they generally cannot be put on without either jacking up the vehicle or requiring the user to crawl under the car and effect a precise positioning of the chain prior to locking the same on the tire. The sequence of installation must be reversed during removal of the chains.

In an effort to solve some of the problems in effecting improved traction for vehicles under adverse driving conditions, it has previously been suggested that the use of a number of discrete chain-like or other traction devices, individually placed on a tire, might solve the problem. U.S. Pat. No. 2,686,550 discloses such a construction wherein a number of individual elements each containing two chain portions are secured to the wheel rim on both the inner and outer sides of the tire. Not only does this disclosure provide a construction which would be difficult to apply and remove, but also it suggests the highly undesirable securement of the traction device to the wheel rim. It is undesirable to take any action which will alter the natural mechanics and structural integrity of the wheel rim. In addition, during the use, wheel rims are subject to damage which might, in turn, produce undesired tire deflation and destroy the traction device, as well as, possibly, making it not only difficult to apply, but if the damage occurs during use, difficult to remove. Others have also suggested securement of traction means to a wheel rim. See, for example, U.S. Pat. Nos. 2,020,586; 2,146,453; 2,395,013; 2,637,363 and 2,731,059.

It has also been suggested to use annular members which are secured to traction means. See, for example, U.S. Pat. Nos. 1,842,742; 2,474,696; 2,579,057; and 3,945,162. These constructions require the use of economically impractical and structurally bulky members.

It has also been known to provide disc-like members with radial arms with the discs being secured to the outer surface of the wheel through the lug nuts which retain the wheel in position. See U.S. Pat. Nos. 2,470,607; 3,130,767 and 3,190,335.

U.S. Pat. No. 2,669,274 discloses the use of a closed wire loop which is bent in a particular configuration and adapted to rest on the wheel rim. See also U.S. Pat. No. 3,939,891.

It has also been suggested that unconventional tire configurations be created so as to permit ready attachment of traction means. In U.S. Pat. No. 4,059,137, a transverse bore is provided radially inwardly of the ground engaging portion of the tire. An anchor for a traction element has passed through the bore. U.S. Pat. No. 2,923,341 provides molded loops within the tire sidewalls for hooking a traction member onto a tire. U.S. Pat. No. 2,946,367 provides a number of lugs which provide upwardly open channels for receipt of traction means.

U.S. Pat. No. 3,856,069 provides inner and outer generally rectangular frame members to which traction means are secured.

Additional systems are disclosed in U.S. Pat. Nos. 3,918,504 and 3,935,891. The former patent discloses the use of inner and outer bar-like members in combination with clamping means and resilient connections. The latter system discloses substantially rigid flanges secured to disc-like members.

There remains, therefore, a very substantial need to improve the ease with which safety improving traction devices may be secured to and removed from vehicle wheels while permitting the use with conventional wheel and tire constructions and not altering detrimentally the tire design or the mechanical and structural characteristics of the wheel.

SUMMARY OF THE INVENTION

The present invention has met the above-described need by providing a wheel-tire assembly which may be of the conventional variety. At least one anchor means is secured to the spider portion of the wheel and disposed on the inner side thereof. Traction means are secured to the anchor means and extend beyond the tire ground engaging portion to the other sidewall where securing means retain the traction means adjacent such other sidewall. The anchor means are preferably demountably secured to the spider portion of the wheel and may be provided with a reentrant portion to receive one end of the traction means. The fastening means securing the anchor means to the spider means may advantageously be passed through existing openings in conventional wheel constructions, or, in the alternative, may be secured in other fashions as by creation of fastener receiving openings within the wheel or welding, for example.

The traction means may advantageously consist of chain segments with end connector portions, one of which is secured to the anchor means, and the other of which is secured to securing means disposed on the outer side of the wheel-tire assembly.

It is an object of the present invention to provide traction means for vehicle wheels which may readily be installed and removed without the burdensome procedures required by the previously known chain systems.

It is a further object of this invention to provide such an assembly wherein installation and use may be effected without requiring the use of unconventional tire or wheel constructions.

It is a further object of the invention to provide such an assembly which may be economically manufactured and partially installed so as to be readily available in the event the need for traction means arises.

It is a further object of this invention to provide such a tire-wheel assembly which is adapted for economic manufacture and use.

It is yet another object of this invention to provide such a vehicle-wheel-tire assembly which is adapted for ready installation and removal without the need for the user jacking up the vehicle when it is necessary to apply or remove the traction means.

It is a further object of this invention to provide such a construction which will be adapted to be durable and serve effectively over prolonged periods of use under adverse road surface conditions and adverse road conditions.

These and other objects of the invention will be more fully understood from the following description of the invention on reference to the illustration appended hereto.

BRIEF DESCRIPTION OF THE DRAWINGS

FIG. 5 is a perspective view, partially exploded, showing a form of anchoring means and fastening means of the present invention.

FIG. 5a is a cross-sectional illustration showing a portion of the anchor means shown in FIG. 5, taken through 5a–5a.

FIG. 12a is a cross-sectional view showing another form of fastening means employed to secure the anchor means to the spider member in the present invention.

FIG. 12b is a fragmentary view of a portion of the fastening means shown in FIG. 12a.

FIG. 13 shows a cross-sectional view of a form of means for resisting lateral movement of the traction means within the anchor means.

FIG. 14 is a cross-sectional view further illustrating the anchor means.

FIG. 15 is a cross-sectional view of another form of fastening means for joining an anchor means to a spider means.

FIG. 16b illustrates portions of the fastening means shown in FIG. 16a.

FIG. 16c illustrates a portion of the fastening means shown in FIG. 16a.

DESCRIPTION OF THE PREFERRED EMBODIMENTS

As used herein, the term "traction means" shall refer to articles which are interposed between a ground engaging surface of a tire and a surface on which a vehicle is adapted to move in order to improve traction of the vehicle and shall expressly include, but not be limited to, chains, cables and formed sheet metal, formed plastic or plastic composite materials, as well as combinations thereof.

Figure 1:
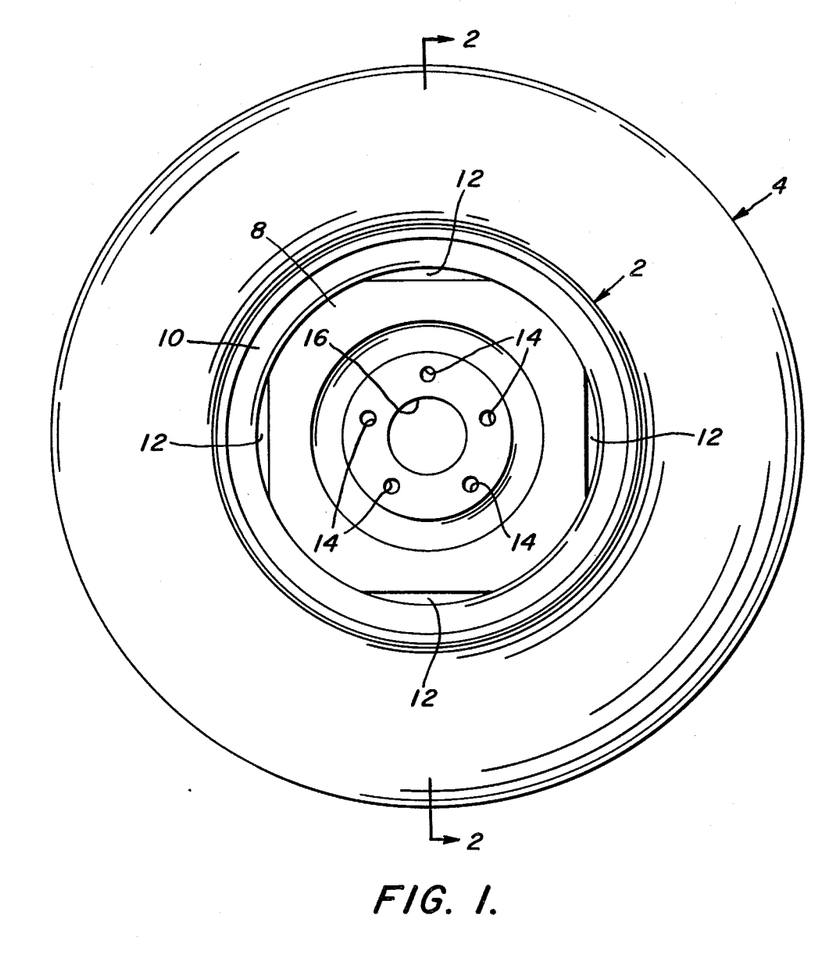
FIG. 1 is an elevational view showing the inner side of a form of conventional wheel-tire combination.
Figure 2:
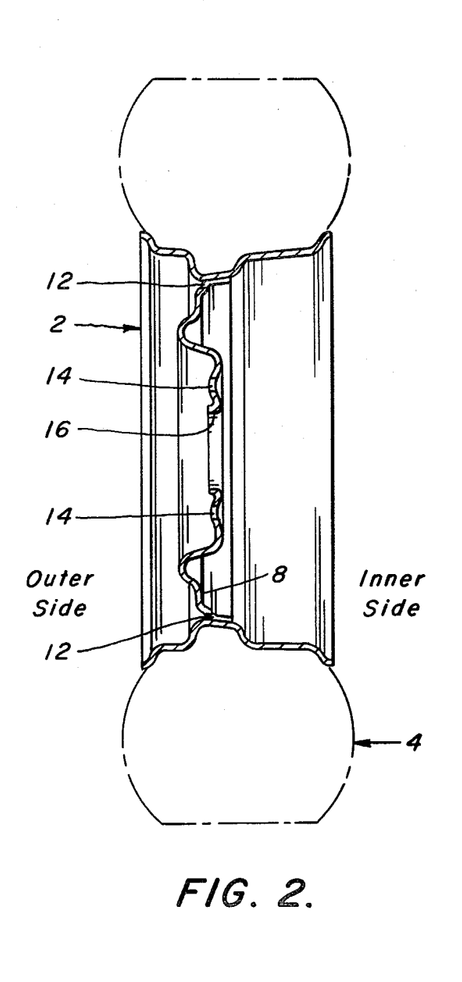
FIG. 2 is a cross-sectional illustration of the wheel-tire assembly of FIG. 1 taken through 2—2.

Referring now to FIGS. 1 and 2, there is shown a conventional form of automobile wheel and tire combination. The wheel consists of a spider portion 8 to which is secured an annular rim 10 on which is mounted the tire 4. The spider is provided with an axle receiving opening 16 and a plurality of fastener receiving openings 14 which permit securement of the wheel to the axle. In the form shown, the spider is provided with a series of four openings 12 which are spaced circumferentially generally equally about the spider. As is shown in FIG. 2, for convenience of reference herein, the wheel and wheel assembly will be considered as having an outer side facing generally away from the vehicle on which it will be mounted and an inner side facing generally in the reverse direction toward the undersurface of the vehicle.

Figure 3:
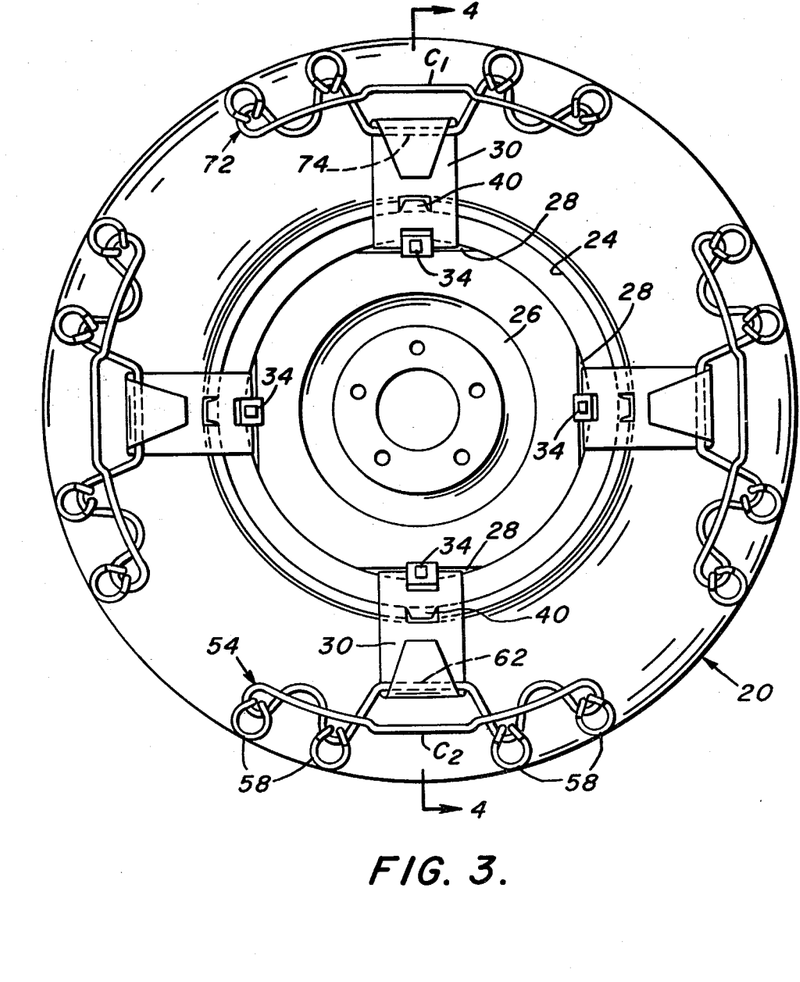
FIG. 3 is an elevational view of the inner surface of a wheel-tire combination showing one embodiment of the present invention.
Figure 4:
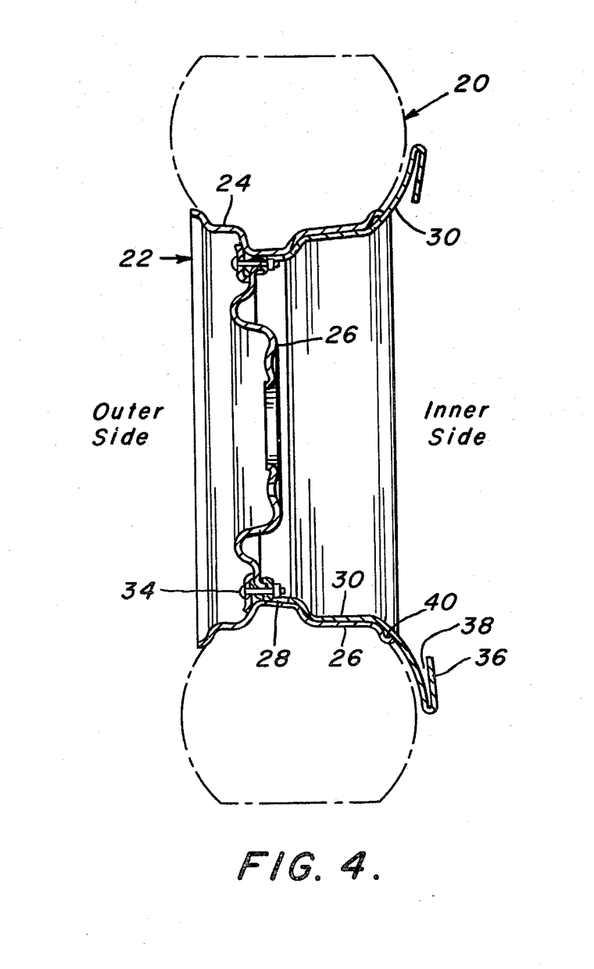
FIG. 4 is a cross-sectional illustration of the tire shown in FIG. 3 taken through 4—4 (shown without the traction means).

Referring now to FIGS. 3 and 4, there is shown a tire 20 mounted on a wheel 22. The wheel has a rim 24 and a spider 26. The spider 26, in the form shown, is provided with four openings 28 spaced generally equally circumferentially about the wheel. Four anchor means 30 are shown secured to the wheel spider 26 by fastener means 34 on the inner side of the wheel. The anchor means 30, in the form shown, has one extremity which is secured to the spider 26 by fastener means 34, which pass through an opening 28 in the spider. The other end of the anchor means 30 is provided with a reentrant portion 36, which defines a generally upwardly open channel 38 for receipt of traction means which will be described in greater detail below. A spacer means 40 which, in the form shown, is an inwardly directed, integrally formed tab which serves to maintain the desired spacing and to reinforce the anchor means 30 and resist radially outwardly directed forces applied to the anchor means 30 by the traction means. This resistance is accomplished by contact between the spacer means 40, which, in the form shown, is an integrally formed tab, and the rim.

Referring still to FIGS. 3 and 4, it will be appreciated that, as is shown in these figures, the anchor means 30 may be secured to the wheel "permanently" with the traction means being applied only when needed. While the description herein, for simplicity of reference, will describe the anchor means 30 as being permanently secured to the spider 26, it will be appreciated that in the preferred embodiments of the invention, they will be so secured as to be removable; however, it will generally be most convenient to leave the anchor means on the tire at all times, with replacement being effected only in the event of damage to the anchor means 30.

Figures 5, 5A:
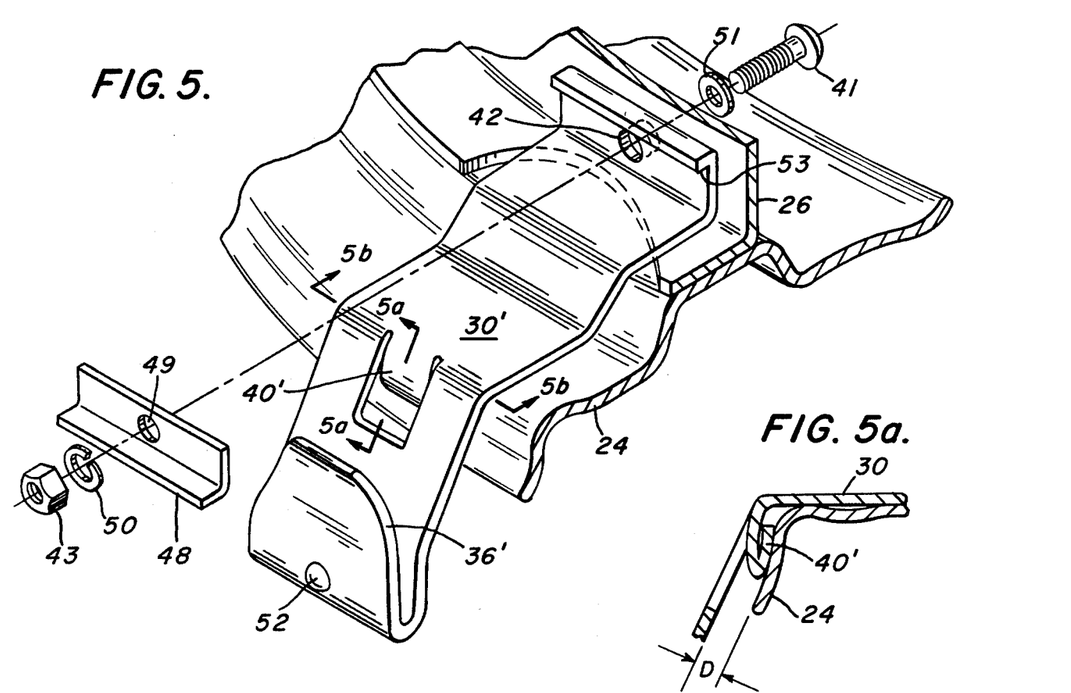

Referring now to FIG. 5, there is shown a different embodiment of the form of anchor means and attachment to the wheel spider. In this embodiment rather than employing a preexisting opening in the spider, the anchor 30 is secured to the wheel by a bolt 41, which passes through a generally circular opening 42 which has been created in the spider. The bolt head, in the form shown, is positioned on the outer side of the spider 26 and is threadedly secured to a nut 43 with interposed lock washer 50 and washer 51. In the form shown, in order to serve as a reinforcing member in creating increased rigidity, a generally L-shaped reinforcing member 48 is positioned with its opening 49 aligned with opening 42 in such fashion that the shank of bolt 41 passes therethrough. The upper portion of the retainer 48 is positioned in underlying relationship with respect to anchor means flange 53. It is noted that in this embodiment, the entire anchor means 30' is positioned inwardly of the spider portion to which it is secured.

It is also noted in FIG. 5 that the anchor means is provided with a rivet 52 which secured reentrant portion 36' to the main body portion of anchor means 30' so as to resist undesired opening or relative separating movement between the reentrant portions 36' and the main body portion 30', which opening would interfere with the structural integrity of the channel which is adapted to receive the traction means.

Referring to FIG. 5a, there is shown a detail of one form of integrally formed spacer 40' formed on anchor means 30. This integrally formed folded tab is adapted to space the undersurface of the anchor means 30 a distance "D" from the rim.

Figures 5B, 6:
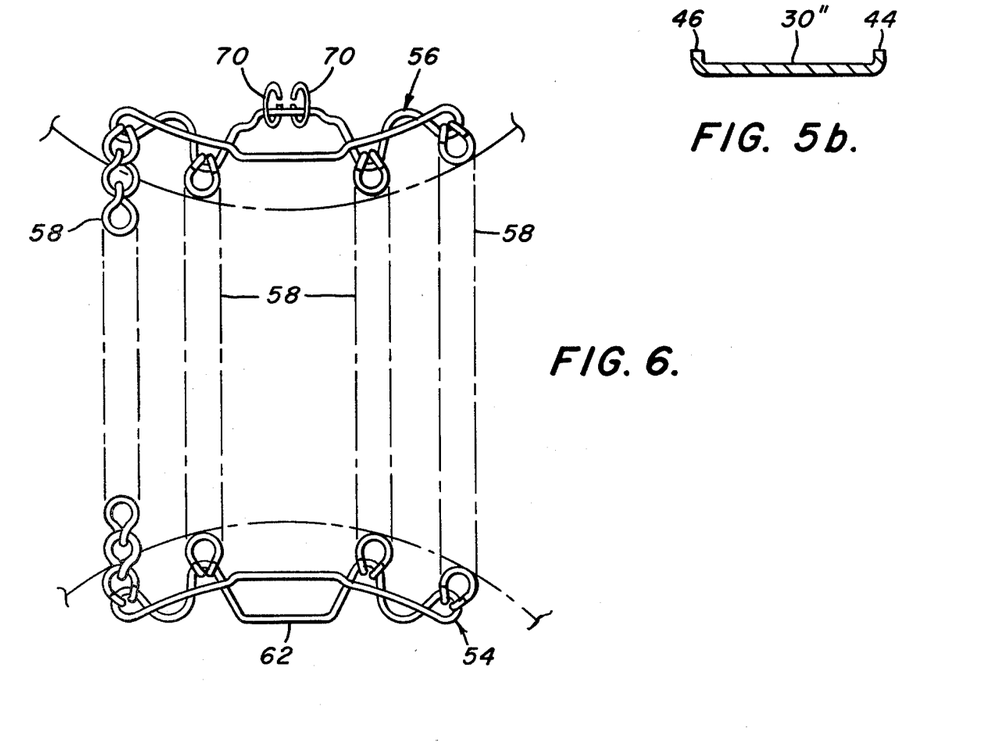
FIG. 5b is a cross-sectional view of the anchor means shown in FIG. 5, taken through 5b–5b, but showing a modified form of lateral edges.
FIG. 6 is an illustration of a form of traction means employed in the present invention.

Referring now to FIG. 5b, there is shown a feature of a preferred form of anchor means 30" which is adapted to not only longitudinally reinforce the anchor means, but also to minimize the likelihood of the edge of the anchor means coming into undesirable contact with the tire 20. In this embodiment the anchor means 30" has a pair of lateral flanges 44, 46, which are preferably coextensive with the region of adjacency between the anchor means 30" and the tire 20, although it may not be present in the reentrant portion 36. In this fashion, contact between the outer surface of the tire and a corner or sharp edge of the anchor means 30" is resisted.

Referring now to FIGS. 3 and 6, a form of traction means employed with the present invention will now be considered. As is shown in FIG. 6, the traction means has an inner end connector portion 54 and an outer end connector portion 56 to which are secured, in the form shown, four chain sections 58. The inner end portion 54 and outer end portion 56 may conveniently be made out of metal rod or bar stock, such as steel having a diameter of approximately ¼ inch, and being of alloy 1008 or 1010, for example. The chain sections 58 are permanently secured to the inner end portion 54 and outer end portion 56. The inner end portion 54 has a retainer bar 62 which is secured within channel 38, defined within anchor means 30.

In using the traction means, one need merely place the inner end portion 54 in such position that the retainer bar 62 can be inserted within channel 38. By gripping the outer end portion 56, the chain segments 58 can then be caused to spread along the ground engaging portion of the tire and the outer end portion 56 moved into contact with the outer sidewall of the tire. Suitable securing means (not shown in this figure) are adapted to cooperate with hooks 70 to maintain outer end portion 56 in the desired position. In this fashion, it will be appreciated that the inner end portion 54 and outer end portion 56 serve as attaching means for securing the traction means to the wheel-tire assembly.

Referring once again to FIG. 3, there is shown a second traction means which has inner end portion 72. It has a retainer bar portion 74 secured within the anchor means 30 shown at the upper portion of the wheel-tire assembly. The center $C_1$ of the inner end portion 72 is so spaced circumferentially from the center $C_2$ of inner end portion 54 as to be generally circumferentially equal regardless of the circumferential direction in which the distance is measured. It is generally preferred in the practice of the present invention that the circumferential direction between traction means used in a vehicle-wheel assembly be generally equal regardless of the number of traction members used. In FIG. 3, four traction means are shown.

Figure 7:
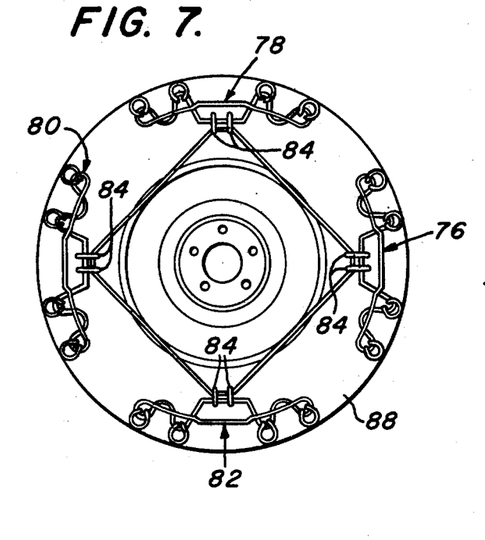
FIG. 7 illustrates an elevational view of the outer side of the form of wheel-tire assembly of the present invention.

Referring now to FIG. 7, there is shown the outer side of a wheel-tire assembly of the present invention wherein four traction means 76, 78, 80, 82 have their outer ends provided with hooks 84 which receive a resilient endless belt member 86 which serves to secure the traction means adjacent the outer sidewall 88 of the tire. In this fashion, it will be appreciated that the inner end portion 54 (of which there would be four in the embodiment shown in FIG. 7) would be secured to the anchor means just as shown in FIG. 3, while the outer end portion would be secured by the resilient band as shown in FIG. 7. In installing such a system, one would merely take the inner end portion of the traction means and engage it within the channel provided in the anchor means while grasping the outer end portion, straighten the traction means in such fashion that the chain strands come into contact with the ground engaging portion of the tire and subsequently engage hooks 84 with the endless band 86.

While, in general, it is contemplated that a minimum of two traction means are preferred for a given wheel-tire assembly, as the circumferential extent of each traction means will generally be such that at least one traction means is always in contact with the ground, greater numbers could be employed should one desire. Also, while the particular traction means selected for purposes of illustration show four chain elements, it will be appreciated that different numbers of chain elements may be employed.

Figure 8:
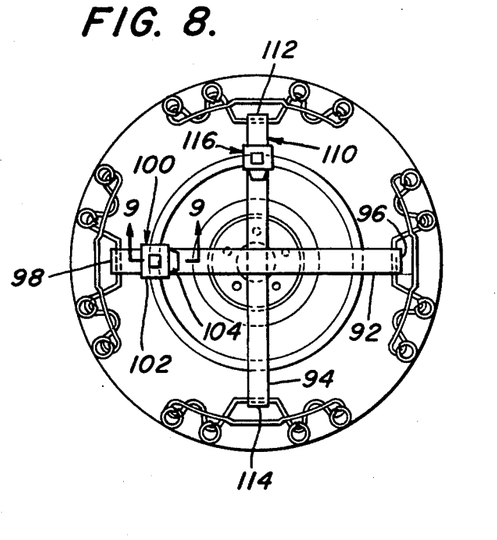
FIG. 8 is similar to FIG. 7 but shows a modified form of means for retaining the traction means in position.

Referring now to FIG. 8, a different form of securing means for the outer end portions of the traction means is illustrated. In this form, a belt 92 which may be of the sort employed in seatbelts in automobiles and airplanes and the like, has one end secured to outer end portion 96 and the other end secured to outer end portion 98. Locking means 100 consist of a female 102 and male 104 buckle arrangement. Similarly, belt 110 is secured to outer end portion 112 and outer end portion 114 with buckle assembly 116 serving as the locking means. Conventional means for adjusting the relative length of the belt may be provided. In this fashion one need merely latch the belts to insure firm positioning of the outer end portions in the desired position and under the desired tension.

Figure 9:
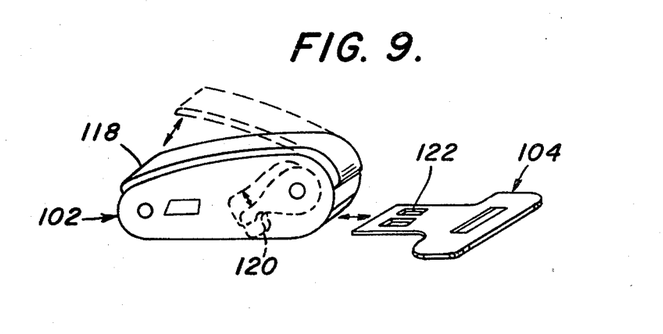
FIG. 9 is a schematic view of the locking means in the embodiment shown in FIG. 8, taken through 9—9.

Referring now to FIG. 9, a cross section of the locking means shown for belt 92 is illustrated. It is contemplated that the belt may have a male member that would be inserted into a latching female member. Engaging teeth 120 would be received in holes 122. The combination would remain permanently secured until a button or lifting lever 118 is actuated for release.

Figures 10, 11A:
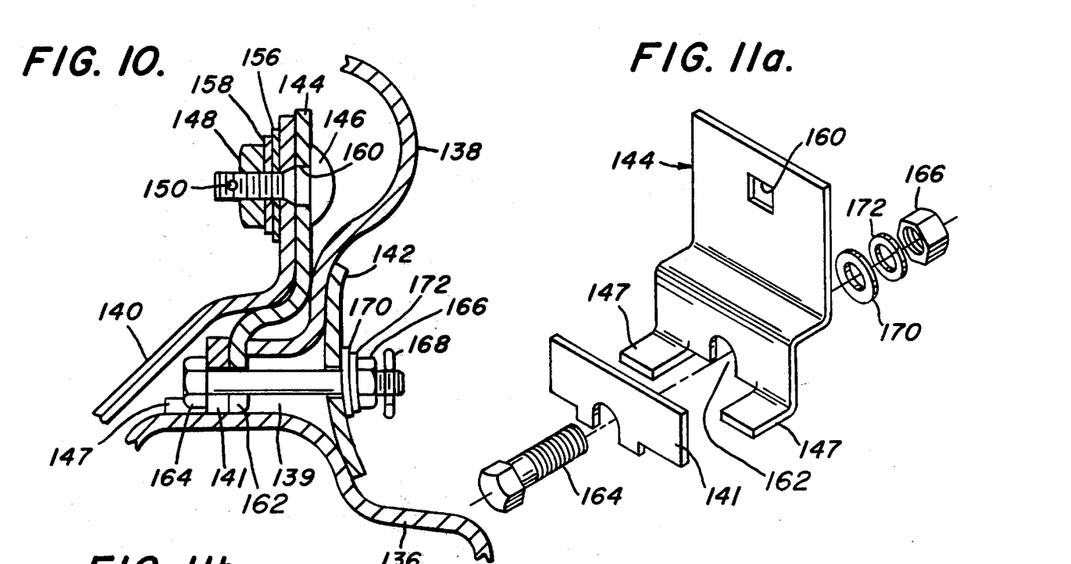
FIG. 10 is a cross-sectional illustration showing a form of fastening means employed in securing the anchoring means to the spider means.
FIGS. 11a and 11b are, respectively, exploded perspective and front elevational views of portions of a clip member employed in FIG. 10.
Figure 11B:
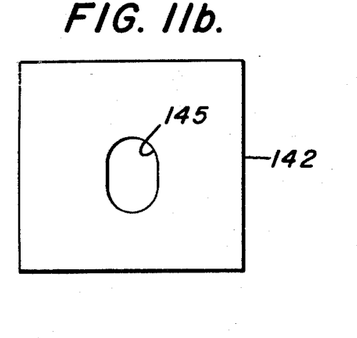

Referring now to FIGS. 10, 11a and 11b, there is shown another embodiment of the invention. In this embodiment, a rim 136 is secured to a spider 138 with the spider having an opening 139. The anchor means 140 is secured to the inner surface of the spider. Retainer clip 142, which is shown in detail in FIG. 11b, is provided with an opening 145 and is positioned with its upper portion in contact with the outer surface of spider member 138 and its lower portion in contact with rim 136. Retainer clip 144, which is shown in detail in FIG. 11a, is positioned on the inner side of the spider 138 and has an upper portion in contact with the spider and a lower flange 147 in contact with the rim 136. In the form shown, the retainer 144 has a generally square opening 160 which receives bolt 146 in such fashion as to resist rotation of the bolt. Bolt 146 passes through the upper portion of anchor means 140 and then through washers 156, 158 and retainer nut 148 with respect to which it is threadedly engaged. A cotter pin 150 is passed through the shank of the bolt 146 so as to resist relative separating movement of the fastener assembly. The lower portion of retainer 144 is provided with a recess 162, which cooperates with the underlying rim 136 to define an opening through which bolt 164 passes. Reinforcement number 141 is interposed between the head of bolt 164 and retainer 144. The bolt 164 passes through opening 145 in retainer clip 142 and then passes through washers 170, 172 and is threadedly engaged with nut 166. A cotter pin 168 which passes through the shank of bolt 164 is employed as a means for resisting relative separating movement of the fastener assembly.

It will be appreciated that in the embodiment shown in FIGS. 10, 11a and 11b, the anchor means is disposed solely on the inner side of the spider member, and securement is effected using preexisting openings in the spider.

Figures 12A, 12B, 13, 14, 15:
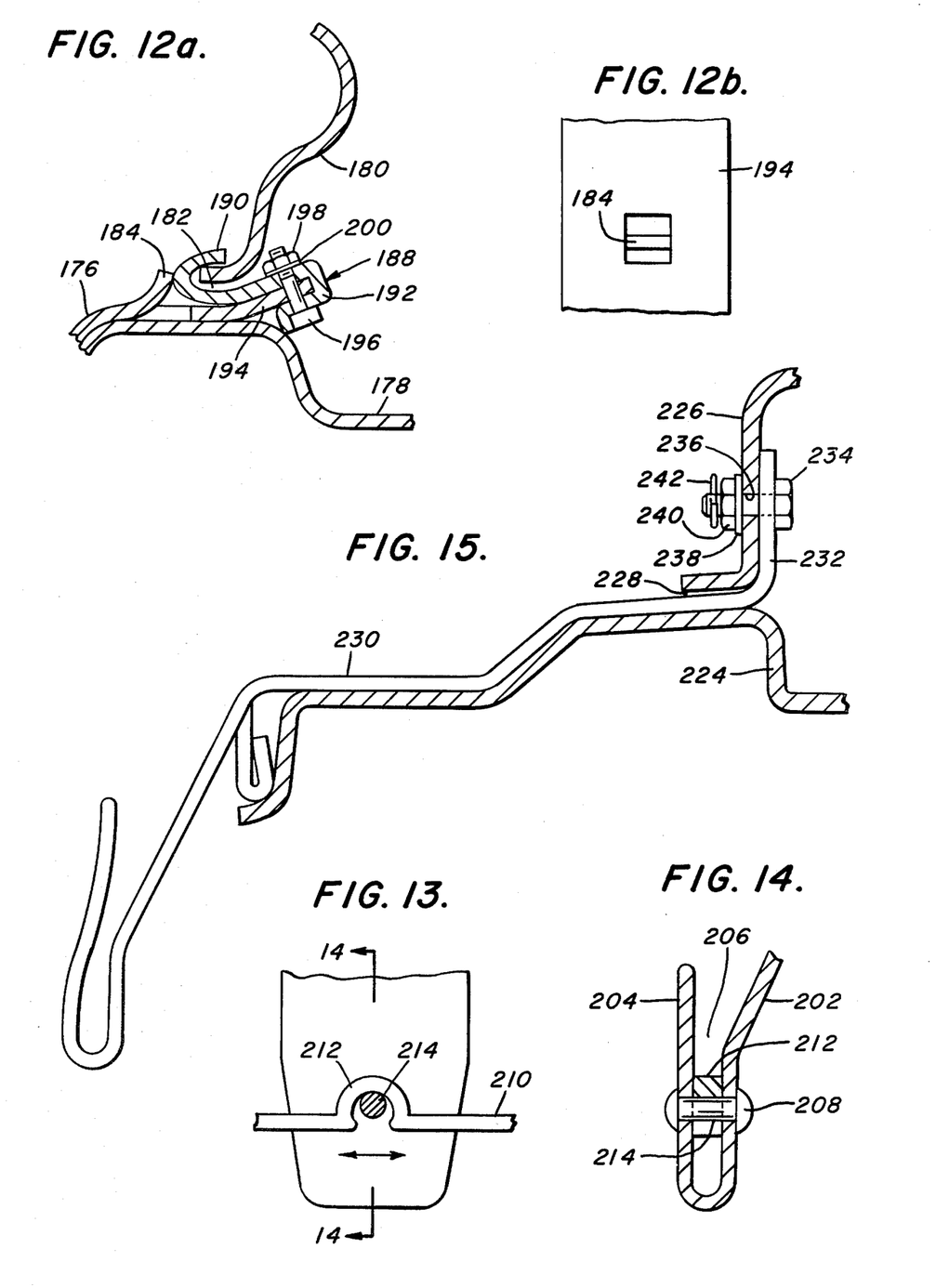

Referring now to FIGS. 12a and 12b, a different embodiment of the invention will now be considered. In this embodiment, anchor member 176 which may be of the sort previously described, except for the portion being fastened, cooperates with rim 178 and spider member 180, which is provided with an opening 182. The anchor member 176 is provided with an integrally formed, upwardly directed, projecting tab 184. A clip member 188, which is of generally S-shaped configuration, has an inner leg 190 which receives the lower portion of spider 180 and is in contact with tab 184. The clip 188 also has an outer leg 192 which receives the free end portion 194 of anchor means 176. A bolt 196 has a shank projecting through two portions of outer leg 192 of clip 188 and through portion 194 of the anchor means 176. The bolt has secured thereto washer 200 and threadedly secured nut 198.

In the embodiment illustrated in FIG. 5, there was shown a rivet 52 which served to retain the desired channel configuration at the lower portion of the anchor means. In the embodiment shown in FIGS. 13 and 14, the anchor means 202 has a reentrant portion 204 which defines upwardly open channel 206. The channel is retained in its desired configuration by means of rivet 208. In addition, the inner end portion 210 of the traction means is provided with a curved section 212, in which is received the rivet shank 214. This interengagement serves to resist relative lateral movement of the inner end portion 210 with respect to the anchor means 202. In FIG. 13, the lateral movement resisted is indicated generally by the double-headed arrow.

Referring now to FIG. 15, there is shown a cross section of another form of fastening means for joining an anchor means to a spider means. In this embodiment, the wheel has a rim 224 and a spider portion 226, which has an opening 228. The anchor means 230 has an outer flange 232 which is in generally surface-to-surface contact with the outer surface of the spider 226. The anchor means 230 passes through opening 228 and is secured by means of bolt 234 which passes through opening 236 in spider member 226. A washer 238, threadedly secured nut 240 and cotter pin 242 serve as a means for retaining the joint.

Figure 16A:
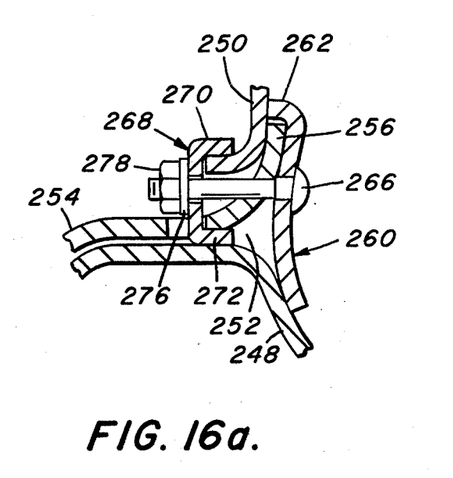
FIG. 16a is a cross-sectional view of another form of fastening means for joining an anchor means to a spider means.
Figure 16B:
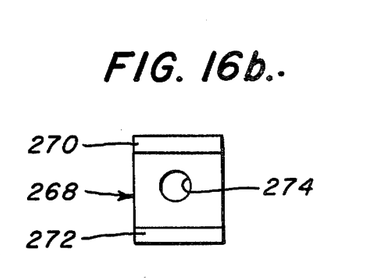
Figure 16C:
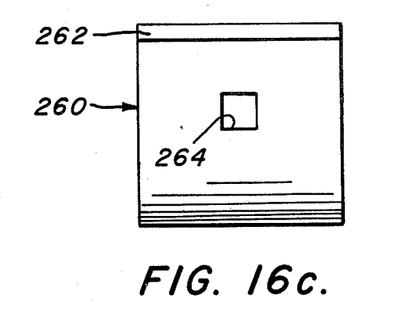

Referring now to FIGS. 16a, 16b and 16c, there is shown an embodiment wherein a portion of the anchor means passes through an opening in the spider but no additional hole is required in the spider. The anchor means 254 has an outer portion which consists of a generally upwardly projecting flange 256 which is in contact with the outer surface of spider 250. The outer clip member 260 has an upper flange 262 and an opening 264 through which passes bolt 266. It will be noted in the form shown that the opening is of generally square configuration so as to resist relative rotational movement between the bolt 226 and the clip 260. Clip member 268 is generally channel-shaped and has an upper flange 270, lower flange 272 and opening 274. The clip 268 passes through an opening in anchor means 254, is engaged with a lower portion of spider member 250 and also is in contact with rim 248. The bolt 266 passes through opening 274 in clip 268 and is retained in position by washer 276 and nut 278.

Figure 17A:
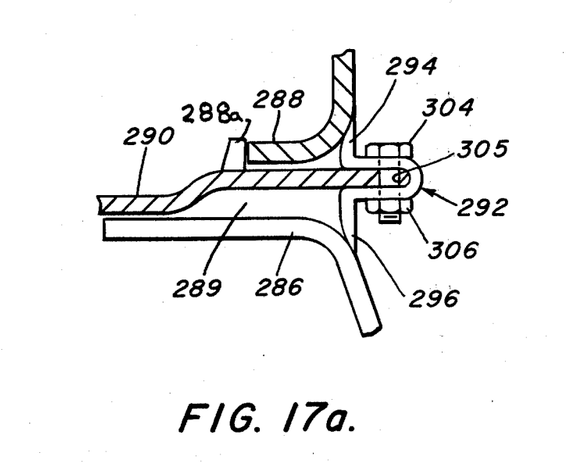
FIGS. 17a, 17b and 17c illustrate another form of fastening means of the invention.
Figure 17B:
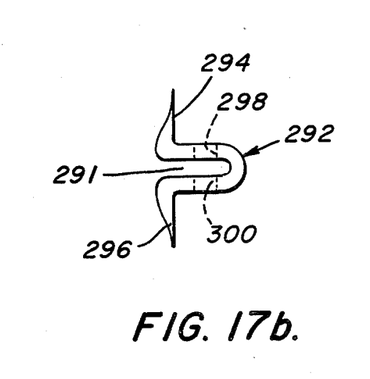
Figure 17C:
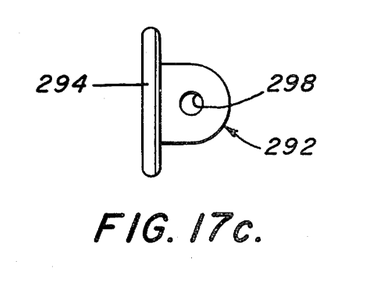

Referring now to FIGS. 17a, 17b, 17c, there is shown another version of the invention. In this embodiment, a rim 286 has an overlying spider 288 which defines an opening 289. An outer portion of the anchor means 290 has stop means 288a projects through the opening and is received within generally inwardly open channel defined by clip 292. The clip, which may advantageously be made of steel, such as alloy 1010, for example, has an upper leg 294 in engagement with spider 288 and a lower leg 296 in engagement with rim 286. A pair of aligned openings 298, 300 permit bolt 304 to pass through the clip 292, and opening 305 in anchor means 290, and to be secured in such position by nut 306.

While for convenience of description herein, various fastener means for securing the anchor means to the spider member have been shown, it will be appreciated that other forms of joinder of the two elements may be employed without departing from the scope of the present invention. For example, other forms of mechanical fastening or other types of joining, such as welding, for example, may advantageously be employed. Welding, for example, may be desired in certain wheels in which 360 degree welds connect the rim to the spider. Otherwise in such wheels, additional openings could be provided.

It will be noted that in the embodiments illustrated, the lower extremity of the anchor means (considered when the tire is so positioned that the anchor means is in the lowest position of its orbital movement) is spaced above the ground level, so as to minimize the likelihood of damaging contact therebetween. In a preferred embodiment of the invention, the lowermost extremity of the anchor means will be positioned about three to five inches above the ground.

While for convenience of reference herein, there has been illustrated anchor members with spacer and/or stiffener means in the form of integrally formed outstruck tabs, it will be appreciated that other means such as integrally formed ribs or separate elements secured to the anchor means or rim, for example, may be employed.

While for convenience of reference herein, use of the invention in connection with a wheel-pneumatic tire combination, it will be apparent that the invention may advantageously be employed in connection with solid tires and other types of vehicle wheels where it is sought to improve traction.

It will also be appreciated that with respect to different size wheels and tires, it may be desirable to alter the geometry of the anchor means and the length of the traction means so as to provide for the effective structural interengagement and relationships described above. For example, it may be desirable to alter the overall length of the anchor means for larger tires, as compared with the anchor means employed with smaller tires.

While two preferred means for restraining the outer portions of the traction means have been disclosed, it will be appreciated that other means may readily be employed.

It will therefore be appreciated that the present invention provides an economical and effective means of permitting easy-to-install and easy-to-remove traction means to be applied to vehicle wheels. All of this is accomplished while permitting the system to be used with conventional vehicle tires and not altering the structural or performance characteristics thereof in any detrimental fashion. This is accomplished by permanently or removably securing the anchor means to the spider portion of the wheel and so designing the traction means and related system components so as to permit ready securement without the need for jacking up the wheel.

Whereas particular embodiments of the invention have been described above for purposes of illustration, it will be evident to those skilled in the art that numerous variations of the details may be made without departing from the invention as defined in the appended claims.

I claim:

1. An anti-skid vehicle wheel assembly comprising:
a wheel having a spider portion and a rim portion,
a tire having a pair of sidewalls and an interposed ground engaging portion,
said tire mounted on said wheel,
said wheel and said tire having outer sides adapted to face generally away from said vehicle when mounted thereon, and inner sides adapted to face generally in the reverse direction,
at least two anchor means secured to said spider portion and disposed, at least in part, on said inner side of said wheel,
said anchor means being spaced generally equally circumferentially,
said vehicle wheel assembly having more than one traction means,
a said traction means secured to each said anchor means adjacent the inner tire sidewall,
said traction means extending beyond said tire ground engaging portion to the outer sidewall,
securing means for securing each said traction means adjacent said outer sidewall, and
said securing means being secured to said traction means but not to said wheel and comprising strap means lying in a plane extending generally perpendicular to the axis of said wheel for exerting a radially inward pull on the ends of the traction means adjacent said outer sidewall.

2. The anti-skid vehicle wheel assembly of claim 1 wherein
said vehicle wheel assembly has four said anchor means, each having offset circumferentially from the next adjacent said anchor means by about 90°.

3. The anti-skid vehicle wheel assembly of claim 1 wherein
said spider portion has at least one opening therein, and
fastener means for securing said anchor means to said spider portion.

4. The anti-skid vehicle wheel assembly of claim 3 wherein
said fastener means have a bolt passing through said anchor means and said spider portion opening, and
a nut threadedly engaged with said bolt, whereby relative separating movement between said spider portion and said anchor means is resisted.

5. The anti-skid vehicle wheel assembly of claim 4 wherein
retainer means resist undesired separation of said nut and said bolt.

6. The anti-skid vehicle wheel assembly of claim 3 wherein
said fastener means include clip means disposed in contact with said spider portion.

7. The anti-skid vehicle wheel assembly of claim 6 wherein
said clip means are disposed in contact with both said spider portion and said rim portion.

8. The anti-skid vehicle wheel assembly of claim 6 wherein
said clip means are disposed on the outer side of said spider portion.

9. The anti-skid vehicle wheel assembly of claim 1 wherein
said anchor means is an elongated unitary member having a first portion secured by said fastener means to said spider portion, and a second portion providing receiving means for securing said traction means to said anchor means.

10. The anti-skid vehicle wheel assembly of claim 1 wherein
said traction means has end connector means at or adjacent each end thereof and at least one interposed traction section.

11. The anti-skid vehicle wheel assembly of claim 10 wherein
said interposed traction section has chains.

12. The anti-skid vehicle wheel assembly of claim 11 wherein
said interposed traction section has a number of chain members connected to said end connector means.

13. The anti-skid vehicle wheel assembly of claim 10 wherein
each said end connector means has a first connector secured to said anchor means and a second connector at or adjacent to the other end of said traction means.

14. An anti-skid vehicle wheel assembly comprising
a wheel having a spider portion and a rim portion,
a tire having a pair of sidewalls and an interposed ground engaging portion,
said tire mounted on said wheel,
said wheel having an outer side adapted to face generally away from said vehicle when mounted thereon, and an inner side adapted to face generally in the reverse direction,
at least one anchor means secured to said spider portion and disposed, at least in part, on said inner side of said wheel,
traction means secured to said anchor means adjacent one said tire sidewall,
said traction means extending beyond said tire ground engaging portion to the other said sidewall,
securing means for securing said traction means adjacent said other sidewall,
said vehicle wheel assembly having more than one said anchor means,
said anchor means being spaced generally equally circumferentially,
said anchor means being an elongated member having a first portion secured by said fastener means to said spider portion, and a second portion providing receiving means for securing said traction means to said anchor means, and
said receiving means including a reentrant portion of said anchor means defining a channel for receipt of said traction means.

15. The anti-skid vehicle wheel assembly of claim 14 wherein
said anchor means has means for resisting relative lateral movement of said traction means within said channel.

16. The anti-skid vehicle wheel assembly of claim 13 wherein
said securing means has resilient band means.

17. The anti-skid vehicle wheel assembly of claim 13 wherein
said securing means has adjustable belt means.

18. The anti-skid vehicle wheel assembly of claim 17 wherein
said belt means have latch means for removably securing said belts in traction means retaining position.

19. The anti-skid vehicle wheel assembly of claim 1 including
said anchor means having reinforcing means.

20. The anti-skid vehicle wheel assembly of claim 19 wherein
said reinforcing means are integrally formed within said anchor means.

21. The anti-skid vehicle wheel assembly of claim 19 wherein
said reinforcing means having spacer means.

22. An anti-skid vehicle wheel assembly comprising
a wheel having a spider portion and a rim portion,
said wheel having an outer side adapted to face generally away from said vehicle when mounted thereon, and an inner side adapted to face generally in the reverse direction,
at least one anchor means secured to said spider portion and disposed, at least in part, on said inner side of said wheel,
said anchor means being an elongated member having a first portion secured by said fastener means to said spider portion and a second portion defining receiving means adapted to secure traction means to said anchor means, and
said anchor means receiving means including a reentrant portion defining a channel for receiving said traction means.

23. The anti-skid vehicle wheel assembly of claim 22 wherein
said anchor means has means for resisting relative opening of the channel defined by said reentrant portion of said anchor means.

24. The anti-skid vehicle wheel assembly of claim 22 wherein
said vehicle wheel assembly has four said anchor means, each having a center offset circumferentially from the next adjacent said anchor means by about 90°.

25. The anti-skid vehicle wheel assembly of claim 22 wherein
said anchor means has reinforcing means.

26. The anti-skid vehicle wheel assembly of claim 25 wherein
said reinforcing means are integrally formed within said anchor means.

* * * * *